Oct. 5, 1926.

E. H. PIECZKO

PHOTOGRAPHIC CAMERA

Filed Sept. 15, 1925

Inventor

EMIL HENRY PIECZKO

By Ralph S. Turoff

Attorney

Oct. 5, 1926.
E. H. PIECZKO
PHOTOGRAPHIC CAMERA
Filed Sept. 15, 1925
1,602,311
2 Sheets-Sheet 2
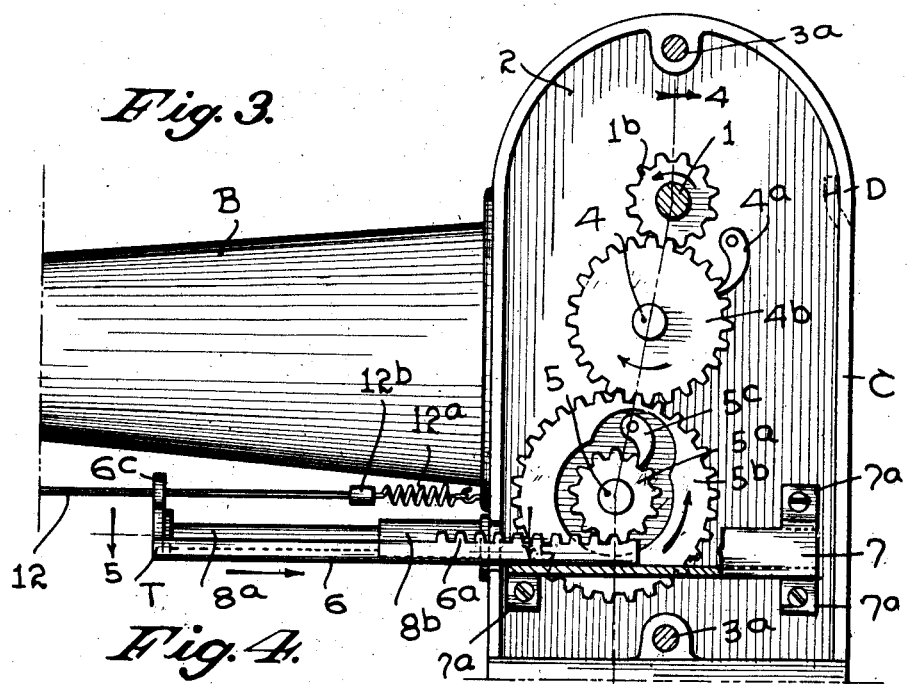
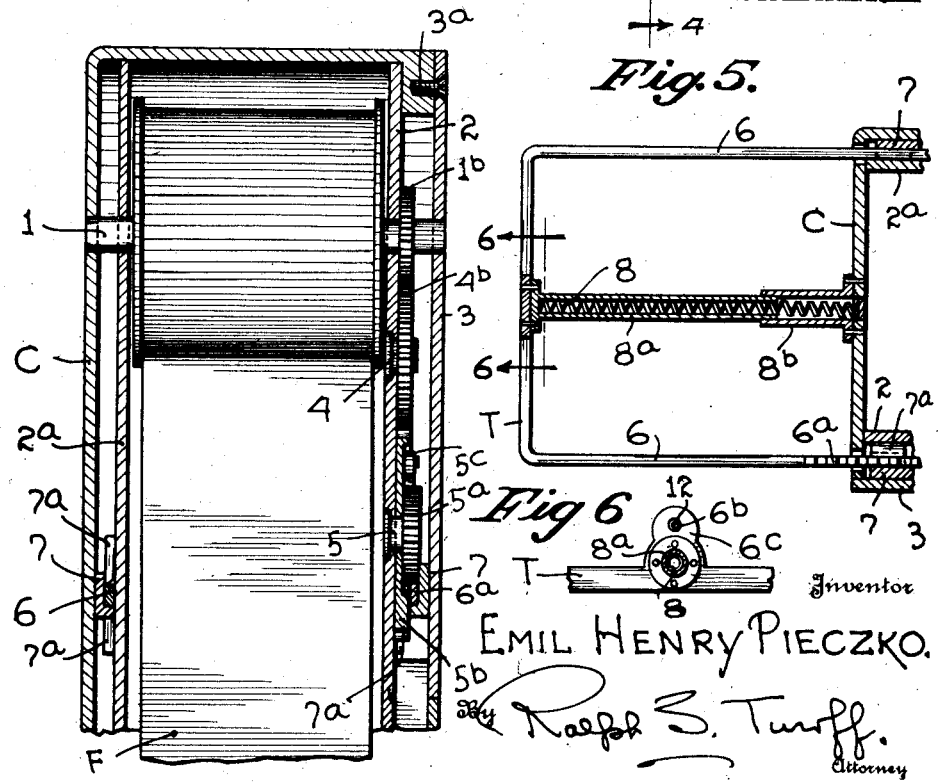

Patented Oct. 5, 1926.

1,602,311

UNITED STATES PATENT OFFICE.

EMIL HENRY PIECZKO, OF HAMMOND, INDIANA.

PHOTOGRAPHIC CAMERA.

Application filed September 15, 1925. Serial No. 56,476.

This invention is a novel photographic camera and is especially designed to meet the requirements of the so-called "gun type" of camera, where the necessity often arises for the extremely rapid taking of a repeated number of pictures or exposures at a relatively great distance. The invention provides an improved camera which can be easily operated; will be strong, durable, and reliable in action; will be compact and light; and be comparatively inexpensive to manufacture.

In the designing of a camera of this type the features of primary importance are speed of negative or film advancement and shutter action. A camera, for example, in the hands of a representative of the law, in order that satisfactory pictures of an escaping criminal or automobile may be taken, must be capable of practically instantaneous advancement of film and corresponding shutter action. The present invention provides a camera of this type which will permit the taking of as many exposures as there are films or negatives, and for as long a period of time as the object remains in sight.

In particular the invention provides novel means for film advancement, novel means, complemental thereto, for operating the shutter mechanism, novel operative connections between the film advancing and shutter actuating mechanisms, and novel means for preventing the spoiling of a negative as by a double exposure. Minor objects of the invention and novel features thereof will be hereinafter set forth.

The accompanying drawings illustrate one practical camera embodying the invention which will be described in detail to enable others to understand and use the same; but the invention is not considered restricted to the specific construction shown in the drawings, and reference is therefore had to the accompanying claims for summaries of the essentials of the invention and of the novel features of construction and of the novel combinations of parts for all of which protection is desired.

In the drawings:

Figure 3 is an enlarged detail view of the film advancing mechanism, parts being broken away.

Figure 4 is a sectional view on the line 4—4 of Figure 3.

Figure 5 is a sectional view on the line 5—5 of Figure 3.

Figure 6 is a detail sectional view on the line 6—6 of Figure 5.

Figure 1:
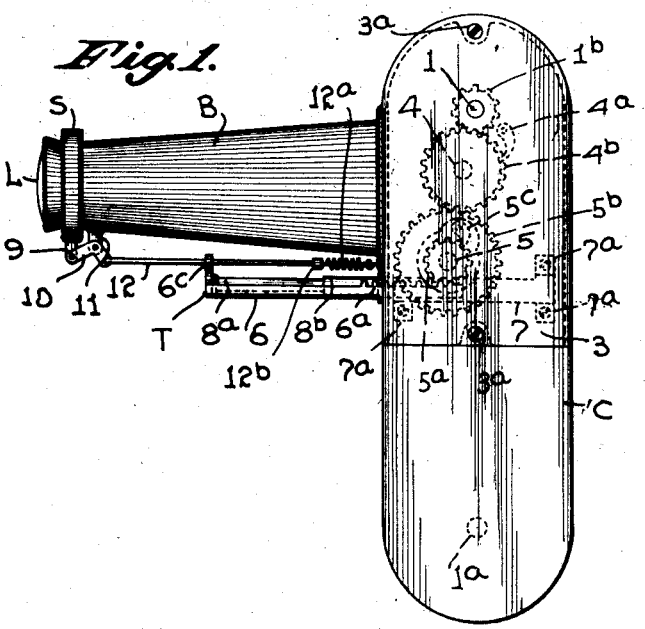
Figure 1 is a side elevation of the complete camera.
Figure 2:
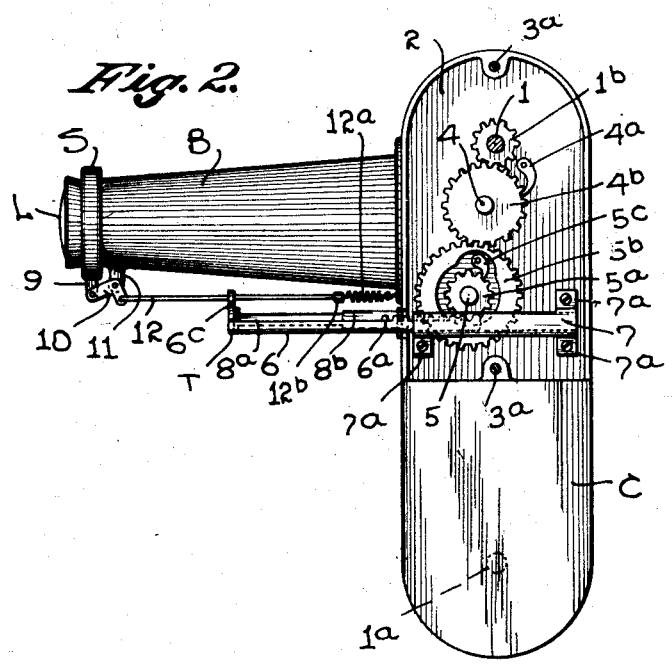
Figure 2 is a view similar to Figure 1, the front cover plate being removed.

As shown in the drawings the camera is substantially gun like in appearance, comprising the magazine or film containing chamber C, the barrel or telescopic portion B, the trigger T, the lens L, and the automatic shutter S. The film containing compartment, which may be of any desired size or shape, has the usual rear door for removal and replacement of rolls of film F wound on the customary spindles 1 and $1^a$. Auxiliary interior walls 2 and $2^a$ are provided for the separate housing of the film advancing mechanism; access thereto being had by the removable front cover plate 3, secured by screws or the like $3^a$. Mounted upon the upper spindle 1, upon which film is designed to be wound after exposure, and between the auxiliary wall 2 and the cover plate 3, is a pinion $1^b$ meshing with an idler pinion $4^b$ on a stub shaft 4. This idler pinion meshes in turn with a pinion $5^b$ on a second stub shaft 5. Loosely mounted on the stub shaft 5 is a pinion $5^a$ partially extending within a depression in the pinion $5^b$ for a purpose to be hereinafter more fully described.

The trigger T is substantially U shaped comprising rearwardly extending arms 6 one of which is toothed for a portion of its length as at $6^a$ forming a rack bar for engagement with the pinion $5^a$. Suitable guides 7 are provided for the arms of the trigger, the guides having integral ears $7^a$ for attachment to the auxiliary interior walls of the film compartment as by screws or the like.

Operative connection between the pinion $5^a$ and the shaft 5 is provided by the pawl $5^c$ pivotally secured to the depressed face of the pinion $5^b$; the pawl being positioned by gravity in the path of the teeth of the pinion $5^a$. Rearward movement of the trigger will cause the turning of the pinion $5^a$ in a counter-clockwise direction; and, motion being transmitted to the shaft 5 and pinion $5^b$ by the locking of the pawl $5^c$, the spindle 1 and pinion $1^b$ thereon will be moved in a similar direction, as indicated by the arrows in Figure 3, through the idler pinion 4ᵇ.

In this manner unexposed film will be advanced in position for exposure opposite the telescopic barrel B. A sufficient number of teeth are provided on the rack bar 6ᵃ to turn the pinion 5ᵃ one complete revolution; it being readily understood that the ratio between the pinions 5ᵇ and 1ᵇ should be such as to advance the film only a sufficient distance for a single exposure.

To return the trigger to its original position a spring 8 is provided suitably housed within a cylinder 8ᵃ secured to the inner face of the cross wall of the trigger. The cylinder 8ᵃ telescopically slides within a cylinder 8ᵇ secured to the opposed face of the film compartment, see Figure 6. Pressure of the trigger rearwardly accordingly results in compression of the spring 8; the trigger being returned to its normal position immediately upon release through the expansion of the said spring.

In the return movement of the trigger, to its normal position, the pinion 5ᵃ is free to turn upon the shaft 5, while the idler pinion 4ᵇ is precluded from any possible reverse movement by the pawl 4ᵃ pivotally secured to the wall 2. If desired the idler pinion might be omitted and a suitable chain (not shown) passing over the pinions 5ᵇ and 1ᵇ might be used to properly transmit motion to the film.

After each advancement of film and before the trigger has returned to a position permitting of any further advancement of the film, it is desirous that the shutter be actuated to expose the negative thus positioned.

Any type of lens or automatic shutter may be employed, the shutter being illustrated diagrammatically and provided with the usual snap lever 9 pivotally connected to one arm of a bell crank lever 10 which is in turn pivotally mounted upon a lug 11 on the barrel B.

The rear arm of the bell crank lever is connected through the cord or wire 12 forming part of the spring 12ᵃ to the opposed face of the film containing compartment C.

The wire 12 is adapted to pass through an eye 6ᵇ formed in an upstanding arm 6ᶜ centrally located on the cross arm of the trigger. A block or enlarged portion 12ᵇ is positioned on the wire adjacent the spring 12ᵃ. Upon rearward movement of the trigger and after complete advancement of the film the arm 6ᶜ will strike the block 12ᵇ thereby actuating the shutter mechanism and exposing the negative.

A second rearward movement of the trigger will again accordingly first advance the unexposed film and actuate the automatic shutter as above described. In this manner any possibility of double exposure is eliminated.

It will thus be seen that the invention provides an improved camera in which film advancement and exposure are complementary results of a single trigger movement; and as rapidly as the trigger can be moved additional negatives may be taken or exposed. The operative mechanism in the preferred form as above described, together with the desired form of camera or case may be cheaply manufactured and will be extremely efficient and durable.

The invention having thus been described, what is claimed is:

1. A camera in the form of a gun having a film retaining chamber having a film-take-up spindle positioned therein comprising a hand hold portion, a sight directing portion including the lens and shutter, and film advancing and shutter actuating means in the form of a trigger comprising a U-shaped bar one arm of which comprises a rack actuating a pinion on the film take up spindle, said shutter actuating means comprising a bell crank lever connected with the shutter proper and also conected with the film retaining chamber by a connector which passes through the aforementioned U-shaped bar, and means on the said bar for actuating said bell crank lever to operate the shutter proper.

2. A camera in the form of a gun having a film retaining chamber having a film-take-up spindle positioned therein comprising a hand hold portion; a sight directing portion including the lens and shutter; and film advancing and shutter actuating means in the form of a trigger comprising a U-shaped bar one arm of which comprises a rack actuating a pinion which in turn actuates a pinion on the film take-up spindle; said shutter actuating means comprising a bell crank lever the forward arm of which is connected to the shutter proper while the rear arm thereof is connected by a wire to the film retaining chamber, said wire passing through an aperture in the cross arm of the trigger and having an abutment thereon whereby engagement of the said trigger with such abutment will actuate the shutter.

3. A camera in the form of a gun having a film retaining chamber having a film-take-up spindle positioned therein comprising a hand hold portion, a sight directing portion including the lens and shutter, and film advancing and shutter actuating means in the form of a trigger comprising a U-shaped bar one arm of which comprises a rack actuating a spindle which in turn actuates a spindle on the film take up spindle, said shutter actuating means comprising a bell crank lever the forward arm of which is connected to the shutter proper while the rear arm thereof is connected by a wire to the film retaining chamber, said wire passing through an aperture in the cross arm of the trigger and having an abutment thereon whereby engagement of the said trigger with such abutment will actuate the shutter, and means for returning said film advancing and shutter actuating means to its normal position comprising a resilient member mounted on said trigger.

4. A camera in the form of a gun having a film retaining chamber having a film-take-up spindle positioned therein comprising a hand hold portion, a sight directing portion including the lens and shutter, and film advancing and shutter actuating means in the form of a trigger comprising a U-shaped bar one arm of which comprises a rack actuating a spindle which in turn actuates a spindle on the film take up spindle, said shutter actuating means comprising a bell crank lever the forward arm of which is connected to the shutter proper while the rear arm thereof is connected by a wire to the film retaining chamber, said wire passing through an aperture in the cross arm of the trigger and having an abutment positioned thereon whereby upon completion of the film advancing operation the cross arm of the trigger will engage said abutment thereby actuating the shutter, and means for returning said film advancing and shutter actuating means to its normal position comprising a resilient member mounted between the cross arm of the trigger and the film retaining chamber.

In testimony whereof he affixes his signature.

EMIL HENRY PIECZKO.